United States Patent
Groom

(10) Patent No.: US 7,764,057 B2
(45) Date of Patent: Jul. 27, 2010

(54) CONSTANT-ON-TIME SWITCHING POWER SUPPLY WITH VIRTUAL RIPPLE FEEDBACK AND RELATED SYSTEM AND METHOD

(75) Inventor: Terry Groom, Dallas, TX (US)

(73) Assignee: Intersil Americas Inc., Milpitas, CA (US)

( * ) Notice: Subject to any disclaimer, the term of this patent is extended or adjusted under 35 U.S.C. 154(b) by 227 days.

(21) Appl. No.: 11/087,323

(22) Filed: Mar. 22, 2005

(65) Prior Publication Data
US 2005/0286269 A1 Dec. 29, 2005

Related U.S. Application Data

(60) Provisional application No. 60/583,268, filed on Jun. 25, 2004.

(51) Int. Cl.
 G05F 1/40 (2006.01)
 G05F 1/00 (2006.01)
 G05B 24/02 (2006.01)
(52) U.S. Cl. .................. 323/283; 323/288; 323/351
(58) Field of Classification Search .............. 363/16, 363/43, 56, 89; 323/282, 283, 284, 288, 323/289, 351
See application file for complete search history.

(56) References Cited

U.S. PATENT DOCUMENTS

| | | | | | |
|---|---|---|---|---|---|
| 3,590,361 | A | * | 6/1971 | Bishop et al. | 363/21.18 |
| 4,145,650 | A | * | 3/1979 | Poppinger et al. | 323/287 |
| 4,439,819 | A | * | 3/1984 | Regan | 363/17 |
| 4,629,970 | A | * | 12/1986 | Johansson | 323/285 |
| 4,713,601 | A | * | 12/1987 | Zahm et al. | 323/322 |
| 5,222,011 | A | * | 6/1993 | Braun | 361/154 |
| 5,422,562 | A | * | 6/1995 | Mammano et al. | 323/282 |
| 5,991,166 | A | * | 11/1999 | Kalfhaus | 363/16 |
| 6,307,356 | B1 | * | 10/2001 | Dwelley | 323/282 |
| 6,366,062 | B2 | * | 4/2002 | Baretich et al. | 323/223 |
| 6,449,175 | B1 | * | 9/2002 | Cuadra et al. | 363/89 |
| 6,495,995 | B2 | | 12/2002 | Groom et al. | |
| 6,583,610 | B2 | | 6/2003 | Groom et al. | |
| 6,643,145 | B1 | * | 11/2003 | Harrison | 363/16 |
| 6,809,504 | B2 | * | 10/2004 | Tang et al. | 323/274 |
| 6,917,188 | B2 | | 7/2005 | Kernahan | |

(Continued)

OTHER PUBLICATIONS

Integrated DDR Power-Supply Solutions for Desktops, Notebooks, and Graphic Cards, MAX8550/MAX8551, Maxim Integrated Products, 2004, pp. 29.

(Continued)

*Primary Examiner*—Edward Tso
*Assistant Examiner*—M'Baye Diao
(74) *Attorney, Agent, or Firm*—Paul A. Bernkopf; Graybeal Jackson LLP; Bryan A. Santarelli

(57) ABSTRACT

A signal regulator includes a switching circuit, a controller, and a threshold generator. The switching circuit generates a regulated output voltage, and the controller activates the switching circuit for a predetermined time when the regulated output signal has a predetermined relationship to a threshold voltage. The threshold generator generates the threshold voltage in response to the controller. Generating the threshold voltage in response to the switching controller can reduce the effect that noise has on the operation of the switching circuit, and can thus decrease the magnitude of the noise-induced jitter in the regulator's steady-state switching frequency as compared to conventional switching regulators.

28 Claims, 6 Drawing Sheets

U.S. PATENT DOCUMENTS

| | | | |
|---|---|---|---|
| 7,019,504 B2* | 3/2006 | Pullen et al. | 323/283 |
| 2001/0033156 A1* | 10/2001 | Buono | 323/282 |
| 2002/0125872 A1* | 9/2002 | Groom et al. | 323/288 |
| 2003/0020442 A1 | 1/2003 | Hwang | |
| 2003/0128015 A1* | 7/2003 | Zuniga et al. | 323/282 |
| 2003/0142519 A1* | 7/2003 | Walters et al. | 363/89 |
| 2005/0237037 A1 | 10/2005 | Xing | |

OTHER PUBLICATIONS

Kafi, Qian, Groom, Synchronous Step Down Controller with Sourcing and Sinking LDO, ISL8550/ISL8551, Intersil Americas Inc., Jun. 2004, pp. 41.

Integrated XScale Regulator Data Sheet ISL6271A, FN9171.1, Intersil Americas Inc., 2004.

Quick-PWM Step-Down Controllers with Inductor Saturation Protection and Dynamic Output Voltages, MAX1992/MAX1993, Maxim Integrated Products, 2002.

5-Bit, 2 Phase Synchronous Buck Controller with 2 LDOs, AQ9220, Arques Technology, 2003.

Dual-Output Voltage Regulator for DDR SDRAM, AQ9260, Arques Technology, 2004.

High-Speed Step-Down Controller for Notebook Computers, MAX1714, Maxim Integrated Products, 1999.

* cited by examiner

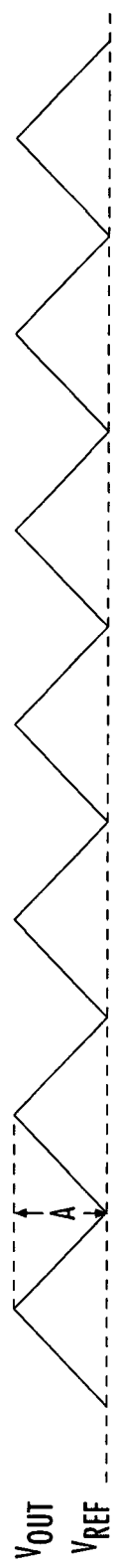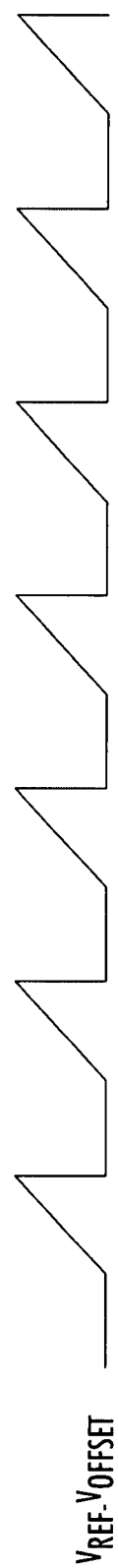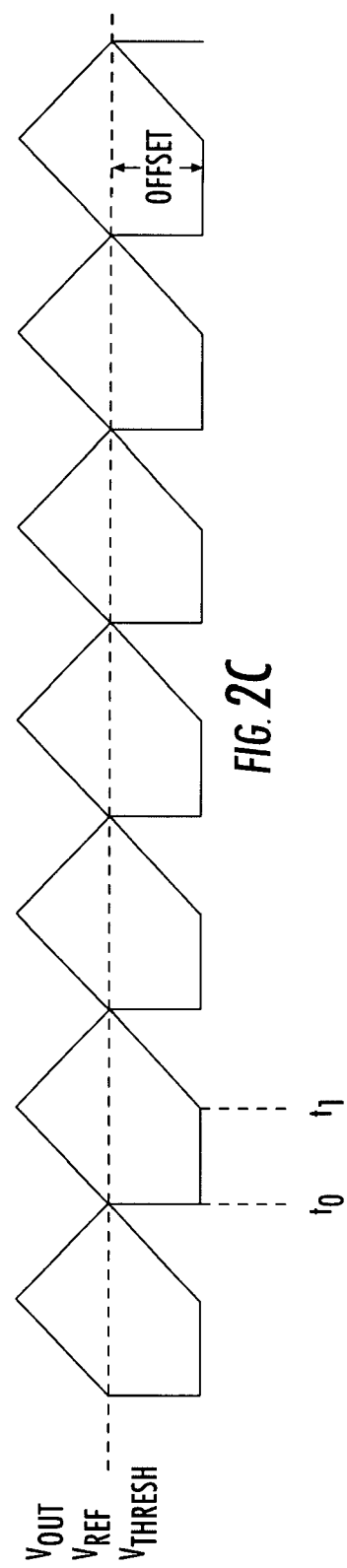
FIG. 2A
FIG. 2B
FIG. 2C

CONSTANT-ON-TIME SWITCHING POWER SUPPLY WITH VIRTUAL RIPPLE FEEDBACK AND RELATED SYSTEM AND METHOD

CLAIM OF PRIORITY

This application claims priority to U.S. Provisional Application Ser. No. 60/583,268, filed on Jun. 25, 2004, which is incorporated by reference.

BACKGROUND

A switching power supply provides a high-efficiency regulated output voltage for a variety of power-management functions that are often required in modern electronic systems. These systems have either a battery or an unregulated power supply as their input power sources, and may have multiple power output voltages that require power conversion, power management functions, and tight regulation.

The function of a switching power supply is to convert power from an input power source to output power for an electronic system. This conversion should be at high efficiency for the various operational modes of the system. For example, when a notebook computer or cellular phone system is operated in a low-power mode, it is desired to extend battery life. On the other hand, a well-regulated voltage supply is desired when the notebook or phone is operated in a high-power mode. Furthermore, the switching power supply is required to respond with little or no regulation error when the notebook or phone changes from a low- to a high-power mode.

Traditionally, a switching power supply provides a regulated output voltage by controlling a supply current through a power switching stage. The switched current is connected to a filter stage, which reduces the resulting ripple voltage. A feedback stage measures the regulated output voltage and, in response to the measured value of the regulated output voltage, generates a control signal that controls the power switching stage.

To regulate the output voltage of a pulse-width-modulated (PWM) switching power supply, the control signal activates the power switching stage when the regulated output voltage drops below a threshold voltage (for a positive regulated output voltage) and then deactivates the switching power stage when the regulated output voltage increases above the threshold voltage. The pulse width of the control signal determines the period of time that the power switching stage provides current to the filter stage, and hence, the supply regulates the output voltage by controlling the widths of the control-signal pulses. Therefore, the pulse width of the control signal is proportional to the current being drawn by the load, and the frequency of the control signal is typically constant.

To regulate the output voltage of a constant-on-time switching power supply, the control signal activates the power switching stage for a predetermined constant time when the regulated output voltage drops below a threshold voltage (for a positive voltage). Therefore, the pulse width of the control signal is constant, and the frequency of the control signal is proportional to the current drawn by the load. Ideally, under steady-state conditions, the supply operates at a constant switching frequency without a synchronizing signal. But in noisy environments, noise may be superimposed on the output voltage or threshold voltage, and this noise may cause jitter in the phase, and thus the frequency, of the control signal. Unfortunately, this jitter may cause the power supply to irradiate electromagnetic interference that can adversely affect the electronic system that incorporates the power supply or nearby electronic systems.

SUMMARY

An embodiment of the invention is a signal regulator that includes a switching circuit, a controller, and a threshold generator. The switching circuit generates an output voltage regulated by the controller, which regulates the output voltage by activating the switching circuit for a predetermined time when the output voltage has a predetermined relationship to a threshold voltage. The threshold generator generates the threshold voltage in response to the controller.

Generating the threshold voltage in response to the controller can reduce the effect that noise has on the operation of the switching circuit, and can thus decrease the noise-induced jitter in the regulator's steady-state switching frequency. For example, the threshold circuit may generate the threshold voltage as the sum of a base voltage and a virtual ripple voltage. The virtual ripple voltage decreases the effect that noise has on jitter by increasing the signal-to-noise ratio. The output equivalent-series-resistance (ESR) voltage ramp combines with the virtual ripple signal to create a total signal that compares to the threshold voltage. Increasing the total signal acts to reduce the magnitude of noise-induced jitter.

BRIEF DESCRIPTION OF THE DRAWINGS

Features and advantages of the invention may best be understood by making reference to the following non-limiting description taken in conjunction with the accompanying drawings, in the several figures of which like referenced numerals identify like elements.

FIGS. 2A-2C are timing diagrams of some of the signals that the power supply of FIG. 1 generates according to an embodiment of the invention.

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the invention. The following detailed description is therefore not to be taken in a limiting sense.

Figure 1:
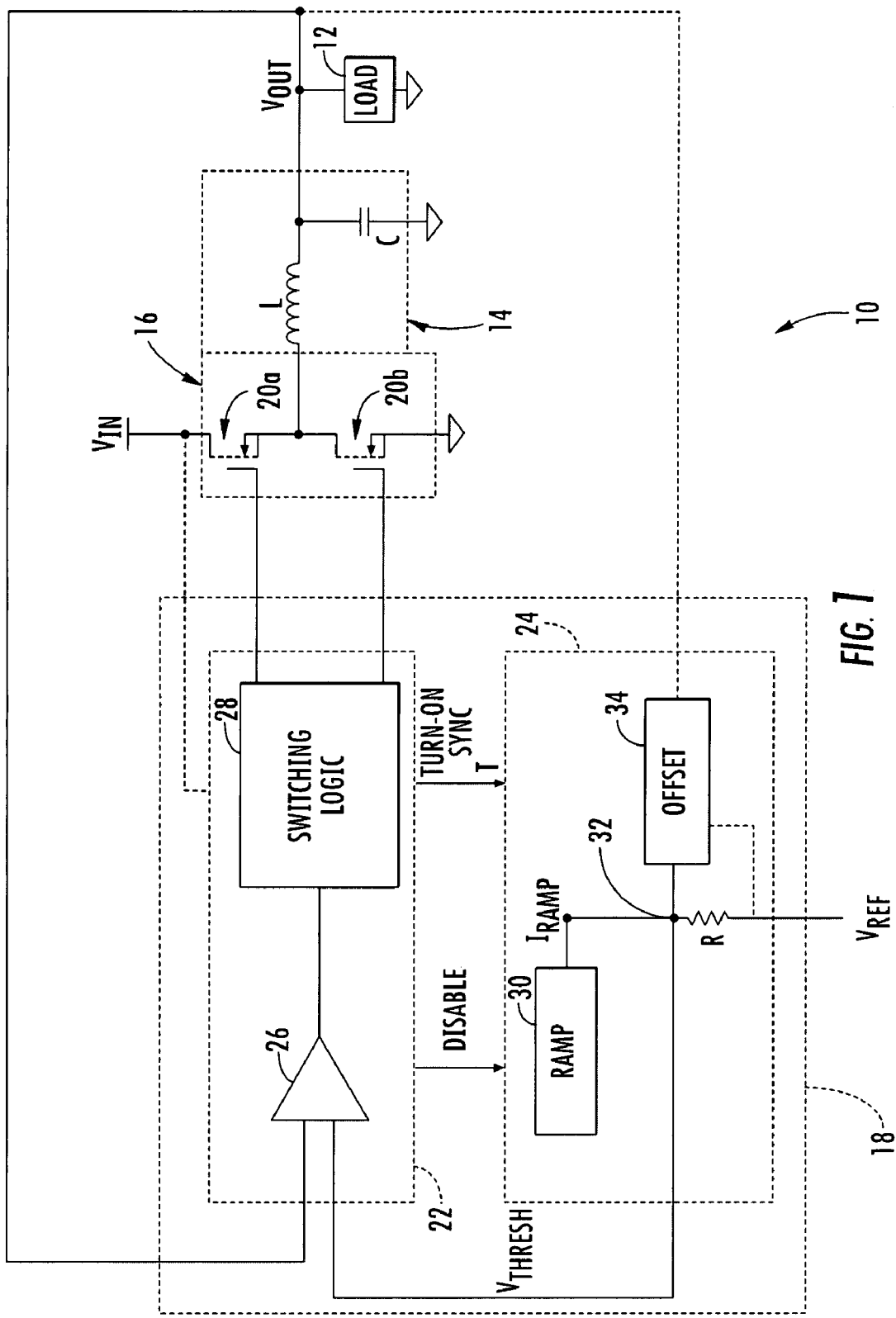
FIG. 1 is a schematic block diagram of a constant-on-time switching power supply with virtual ripple feedback according to an embodiment of the invention.

FIG. 1 is a schematic block diagram of a constant-on-time buck-converter power supply 10, which uses virtual ripple feedback and which provides a regulated voltage Vout to a load 12 according to an embodiment of the invention. The supply 10 includes a filter 14, a switching circuit 16, and a regulator 18. The following discussion assumes that Vout is a positive voltage, although a similar discussion applies where Vout is negative. Furthermore, one can incorporate the supply 10 into virtually any electronic system, such as a laptop computer, that requires power conversion.

The filter 14 includes an inductor L and a capacitor C, and the switching circuit 16 includes NMOS power transistors 20a and 20b, which have their source and drain, respectively, coupled to the inductor L. The drain of the transistor 20a is coupled to Vin, which is the supply voltage (possibly unregulated) from which the supply 10 generates Vout. Because the supply 10 is a buck step-down converter, Vin is higher than Vout. Vin may also be coupled to the regulator 18 as discussed below.

The regulator 18 includes a switching controller 22 and a threshold-signal generator 24. The controller 22 includes a comparator 26 for comparing Vout to the threshold signal, which is a voltage Vthresh in this embodiment, and includes conventional switching logic 28 for activating the transistor 20a for a predetermined constant time in response to Vthresh being greater than Vout. The generator 24 includes a ramp circuit 30 for sourcing a ramped current IRamp to a node 32, a resistor R for coupling a reference voltage Vref to the node, and an offset circuit 34 for sinking from the node a constant current that induces an offset voltage Voffset on the node. Therefore, when IRamp=0, Vthresh=Vref−Voffset. The circuit 34 may also be coupled to Vref and Vout as discussed below. Furthermore, Vref may be derived from a band-gap reference generator, or generated in any other suitable manner.

FIG. 2A is a timing diagram of Vout as generated by the power supply 10 (FIG. 1) during steady-state operation of the load 12 according to an embodiment of the invention. Ideally the power supply 10 generates Vout so that it does not fall below Vref Therefore, the average level of Vout under ideal steady-state conditions equals Vref+A/2, where A is the peak-to-peak ripple amplitude, which is typically on the order of a few millivolts (mV).

FIG. 2B is a timing diagram of Vthresh according to an embodiment of the invention where Voffset is negative. The ramp circuit 30 generates IRamp so as to generate Vthresh (at the node 32) as a saw-tooth wave having a base voltage equal to Vref−Voffset and a peak-to-peak voltage on the order of a few millivolts. Therefore, Vthresh is a virtual ripple voltage that is superimposed on the base voltage. Furthermore, Vthresh is generated in response to switching-state feedback from the controller 22, and optional feedback from Vout (dashed line to the offset circuit 34).

FIG. 2C is a timing diagram of Vthresh and Vout according to an embodiment of the invention. Because of the saw-tooth shape of Vthresh and the ripple on Vout, the difference between Vout and Vthresh is relatively large except when Vout and Vthresh simultaneously "meet" at Vref. This difference significantly increases the noise margin compared to conventional techniques such as where Vthresh merely equals Vref.

Referring to FIGS. 1 and 2C, the operation of the power supply 10 is discussed according to an embodiment of the invention wherein Vin is not coupled to the regulator 22 and neither Vref nor Vout is coupled to the offset circuit 34.

At time t0, in response to the comparator 26 sensing Vout becoming less than Vthresh, the switching logic 28 deactivates the transistor 20b and activates the transistor 20a, thus causing a charging current to flow from Vin, through the inductor L, to the filter capacitor C and to the load 12—ideally, the rising Vthresh and falling Vout "meet" at Vref, such that Vout becomes less than Vref at the same time that it becomes less than Vthresh. This charging current causes Vout to rise. Assuming that in a steady state the load 12 draws a constant current, the actual rate of this rise depends on the capacitance and equivalent series resistance (ESR) of C. In one embodiment, the capacitance and ESR of C are sufficiently large such that Vout increases at a substantially constant rate (i.e., straight line) as shown.

Also at time t0, in response to activating the transistor 20a, the switching logic 23 generates a DISABLE signal, which causes the threshold-signal generator 24 to "discharge" the node 32 to the base voltage of Vref−Voffset.

At time t1, which is a predetermined constant time after t0, the switching logic 23 deactivates the transistor 20a and activates the transistor 20b, thus allowing the current stored in the inductor L to continue flowing. As this current decays, Vout falls. When Vout falls below Vthresh, the above-described cycle is repeated.

Also at time t1, in response to deactivating the transistor 20a, the switching logic 23 generates a TURN-ON SYNC signal, which causes the ramp generator 30 to generate IRamp, and thus causes the threshold-signal generator 24 to ramp Vthreshold upward from the base voltage Vref−Voffset at a predetermined rate. When Vthresh rises above Vout, the above-described cycle is repeated. If one knows the steady-state current drawn by the load 12, then he can calculate the steady-state ripple of Vout, and set Voffset and the slope of the Vthresh ramp such that during steady-state operation of the load, Voffset and Vout "meet" at Vref as is desired.

Referring to FIGS. 2A and 2C, during load transients, the minimum level of Vout may be less than or greater than Vref. During a transient period when the load 12 draws more current, the ripple amplitude A increases, and Vthresh and Vout "meet" at a voltage less than Vref. Conversely, during a transient period when the load 12 draws less current, the ripple amplitude A decreases, and Vthresh and Vout "meet" at a voltage greater than Vref.

But one typically knows or can determine the parameters of the load transient currents, and can thus design the power supply 10 such that the minimum and maximum voltages where Vthresh and Vout "meet" during load transients are within respective voltage ranges that allow the load 12 to operate properly during these transients.

Furthermore, because the comparator 26 compares Vout to Vthresh instead of to the constant Vref, the noise margin is often increased, and thus jitter in the switching frequency, and the undesirable affects of such jitter, are often reduced.

Referring again to FIG. 1, if Vin changes over time (e.g., a discharging battery), then the ripple amplitude A (FIG. 2A) may at some times exceed (e.g., when the battery fully charged) an amount acceptable by the load 12. Therefore, the regulator 22 (typically the switching logic 28) may include circuitry that adjusts the on time of the transistor 20a (on time=t1−t0) based on the amplitude of Vin (which the regulator 22 may receive as indicated by the dashed line between the regulator and Vin). As Vin increases, the regulator 22 decreases the on time, and as Vin decreases, the regulator increases the on time. Examples of such on-time adjusting circuits are included in U.S. provisional application Ser. No. 60/565,058 and in U.S. Pat. No. 6,495,995, which are incorporated by reference.

Furthermore, because the generator 24 operates in an open-loop configuration relative to Vout, if the generator is not properly calibrated or drifts with temperature or other environmental conditions, then Voffset and IRamp may be such that Vout and Vthreshold do not "meet" at Vref. Therefore, the offset circuit 34 can receive Vout and Vref, and adjust Voffset such that the switching logic 28 activates the transistor 20*a* when Vout falls to Vref as in FIG. 2A. This effectively adds feedback control to the supply 10. But because such drifting usually occurs relatively slowly, then this feedback loop can be relatively slow, and thus have a relatively large stability margin.

Figure 3:
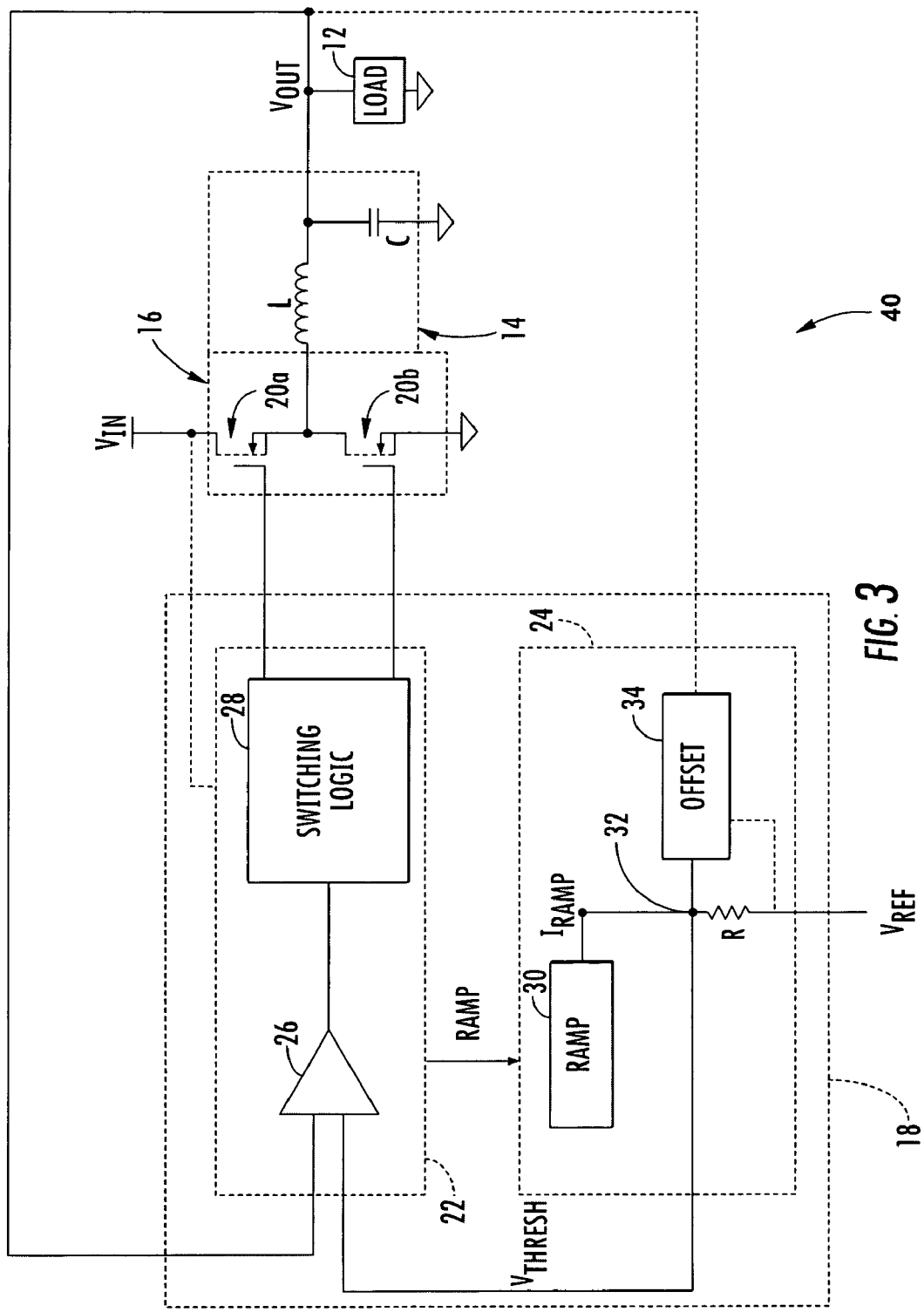
FIG. 3 is a schematic block diagram of a constant-on-time switching power supply with virtual ripple feedback according to another embodiment of the invention.

FIG. 3 is a schematic block diagram of a constant-on-time buck-converter power supply 40, which uses virtual ripple feedback and which provides a regulated voltage Vout to the load 12 according to another embodiment of the invention. The supply 40 is similar to the supply 10 of FIG. 1 except that the switching controller 22 provides a pulse RAMP to the threshold-signal generator 24 instead of providing the signals DISABLE and TURN-ON SYNC to the generator. Therefore, like numbers refer to components common to the supplies 10 and 40. Furthermore, the following discussion assumes that Vout is a positive voltage, although a similar discussion applies where Vout is negative. Moreover, like the supply 10, one can incorporate the supply 40 into virtually any electronic system, such as a laptop computer, that requires power conversion.

Figure 4A:
FIGS. 4A-4C are timing diagrams of some of the signals that the power supply of FIG. 3 generates according to an embodiment of the invention.

FIG. 4A, which is similar to FIG. 2A, is a timing diagram of Vout as generated by the power supply 40 (FIG. 3) during steady-state operation of the load 12 according to an embodiment of the invention.

Figure 4B:
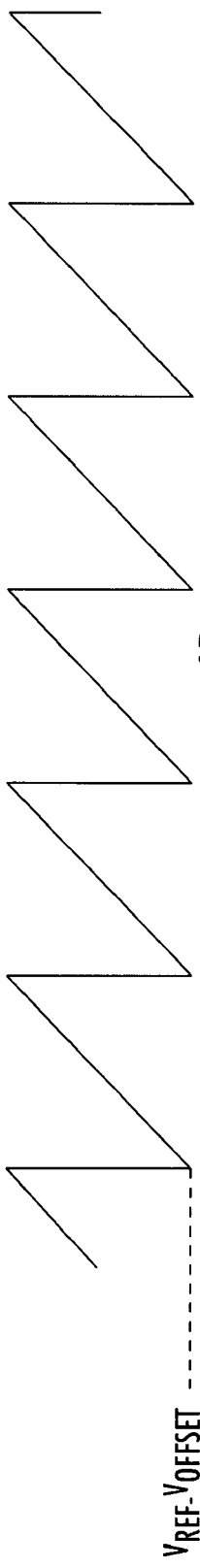

FIG. 4B is a timing diagram of Vthresh as generated by the threshold-signal generator 24 of the power supply 40 (FIG. 4) according to an embodiment of the invention where Voffset is negative. Vthresh of FIG. 4B is similar to Vthresh of FIG. 2B except that Vthresh of FIG. 4B is ramped, not flat, between times t0 and t1. Vthresh is generated in response to the RAMP pulse from the controller 22 as discussed below.

Figure 4C:
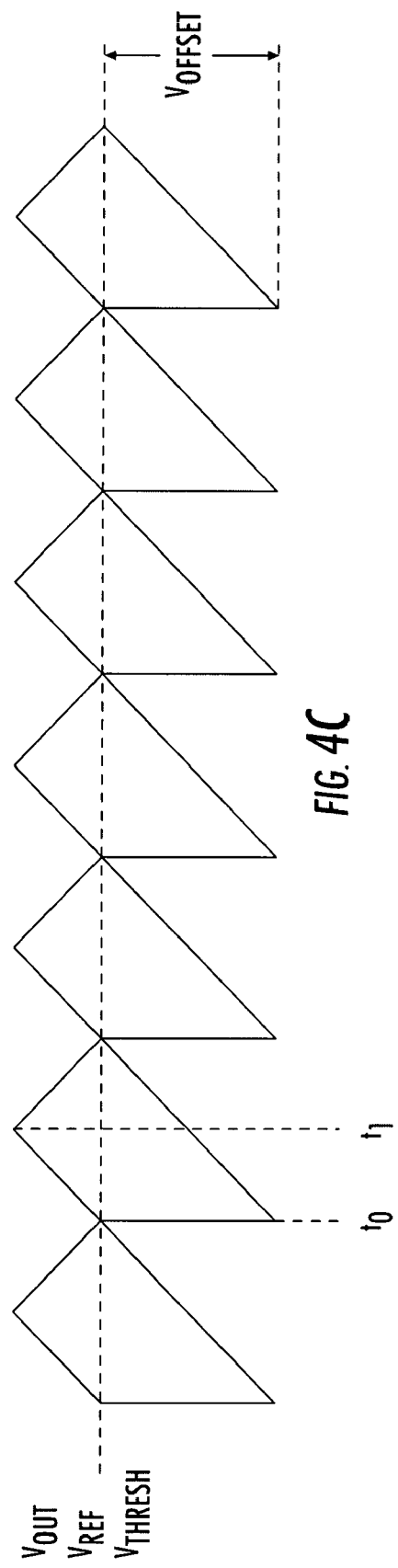

FIG. 4C is a timing diagram of Vthresh and Vout as generated by the power supply 40 of FIG. 4 according to an embodiment of the invention. The timing diagram of FIG. 4C is similar to the timing diagram of FIG. 2C except that the signal Vthresh of FIG. 4C is ramped, not flat, between times t0 and t1.

Referring to FIGS. 3 and 4C, the operation of the power supply 40 is discussed according to an embodiment of the invention wherein Vin is not coupled to the regulator 22 and neither Vref nor Vout is coupled to the offset circuit 34.

At time t0, in response to the comparator 26 sensing Vout becoming less than Vthresh, the switching logic 28 deactivates the transistor 20*b* and activates the transistor 20*a*, thus causing a charging current to flow from Vin, through the inductor L, to the filter capacitor C and to the load 12. Ideally, the rising Vthresh and falling Vout "meet" at Vref, such that Vout becomes less than Vref at the same time that it becomes less than Vthresh. This charging current causes Vout to rise. Assuming that in a steady state the load 12 draws a constant current, the actual rate of this rise depends on the capacitance and equivalent series resistance (ESR) of C. In one embodiment, the capacitance and ESR of C are sufficiently large such that Vout increases at a substantially constant rate (i.e., straight line) as shown.

Also at time t0, in response to activating the transistor 20*a*, the switching logic 23 generates a RAMP pulse, which causes the threshold-signal generator 24 to "discharge" the node 32 to the base voltage of Vref−Voffset, to generate IRamp, and to thus ramp Vthreshold upward from the base voltage Vref−Voffset at a predetermined rate.

At time t1, which is a predetermined constant time after t0, the switching logic 23 deactivates the transistor 20*a* and activates the transistor 20*b*, thus allowing the current stored in the inductor L to continue flowing. As this current decays, Vout falls. When Vout falls below Vthresh, the above-described cycle is repeated.

Other than the threshold-signal generator 24 ramping Vthreshold before the switching logic 23 deactivates the transistor 20*a* and activates the transistor 20*b*, the operation of the power supply 40 of FIG. 3 is similar to the operation of the power supply 10 of FIG. 1.

Figure 5:
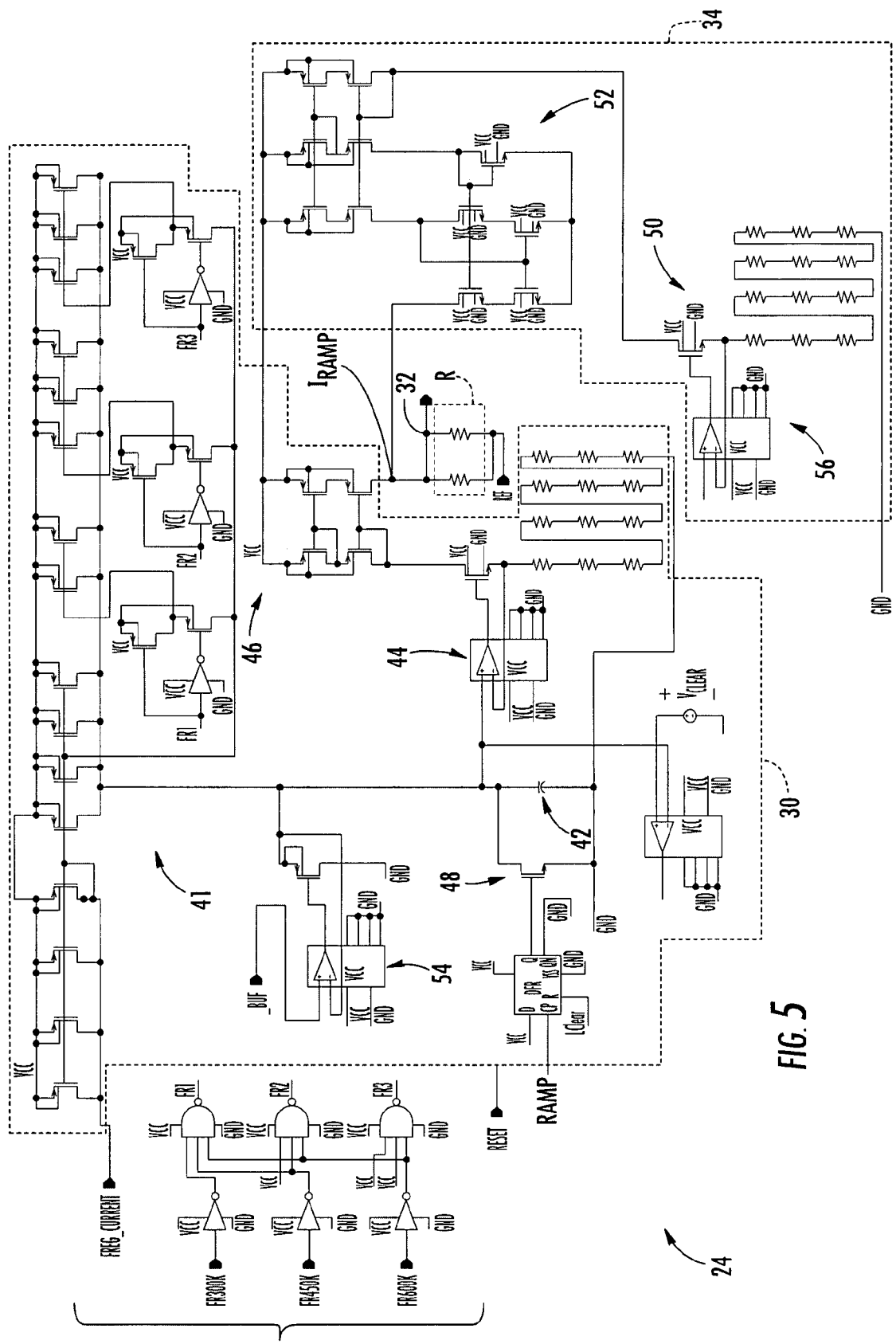
FIG. 5 is a detailed schematic diagram of the power supply of FIG. 1 according to an embodiment of the invention.

FIG. 5 is a schematic diagram of the threshold generator 24 of the power supply 40 of FIG. 3 according to an embodiment of the invention.

The ramp circuit 30 includes a constant current source 41, which, when active charges a capacitor 42 to generate a voltage that ramps upward at a constant rate. An amplifier 44 draws from the input branch of a current mirror 46 a current that is proportional to the voltage across the capacitor 42, and the output branch of the current mirror sources IRamp to the node 32, thus generating the ramped portion of Vthresh. The current source 41 is adjustable so that one can select the slope of the ramped portion of Vthresh for the desired frequency of the ripple on Vout. When Vout becomes less than Vthresh (FIG. 4C), the RAMP pulse causes a transistor 48 to discharge the capacitor 42, thus bringing IRamp to zero and returning Vthresh to Vref−Voffset as in FIGS. 4B and 4C. But when the voltage across the capacitor 42 falls below a predetermined voltage Vclear, then a signal Lclear causes the transistor 48 to deactivate, thus allowing the capacitor 42 to begin charging again. Consequently, Vthresh begins ramping again a short time after t0 and a significant time before t1 as shown in FIG. 4C. In one embodiment, Vclear is approximately 100 millivolts or less.

The offset circuit 34 includes an amplifier circuit 50 that sinks a predetermined constant current from an input branch of current mirror 52. An output branch of the current mirror 52 sinks an offset current from the node 32 to generate Voffset.

A circuit 54 prevents the current source 41 from saturating by limiting the voltage across the capacitor 42 to a level that is at least approximately one transistor-threshold Vth drop below Vcc. That is, a voltage BuF≦Vcc−Vth, where Vth is the threshold voltage of the transistors that compose the current source 41.

In a similar manner, a circuit 56 prevents the current source 52 from saturating.

Other embodiments of the power supplies 10 (FIG. 1) and 40 (FIG. 3) are contemplated. For example, the supplies 10 and 40 may generate a negative voltage for Vout.

Figure 6:
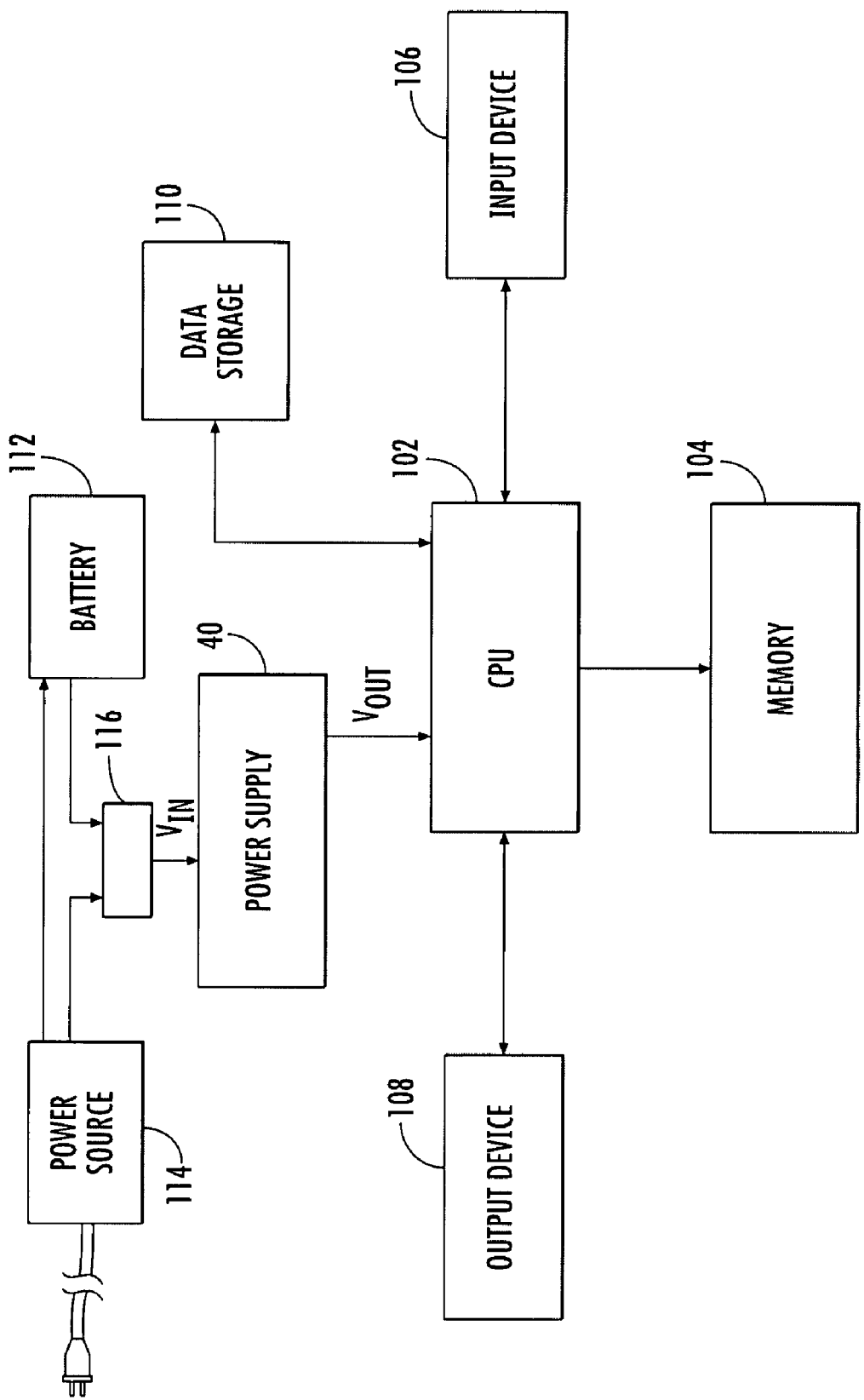
FIG. 6 is a schematic block diagram of a computer system that can incorporate the power supplies of FIGS. 1 and 4 according to an embodiment of the invention.

FIG. 6 is a schematic block diagram of a computer system 100, such as a notebook computer system, which incorporates the power supply 10 of FIG. 1, the supply 40 of FIG. 3, or both the supplies 10 and 40 according to an embodiment of the invention. For clarity, however, the computer system 100 is shown incorporating only the supply 40.

The computer system 100 includes a central processing unit (CPU) 102, a memory 104, an input device 106, and output device 108, a data-storage device 110, a battery 112, a power source 114, and a supply selector 116. The CPU 102 executes programming instructions and manipulates data stored in the memory 104, which is, e.g., a volatile memory such as dynamic random access memory (DRAM). The CPU 102 can also store data in the data-storage device 110, which is, e.g., a nonvolatile device such as a hard-disk drive. The CPU 102 receives data and commands from the input device 106, which is, e.g., a keyboard or a mouse, and provides data to the output device 108, which is, e.g., a monitor or printer.

The power source 114, when active, converts 110-120 VAC from an electrical receptacle (not shown) into Vin, and the selector 116 couples Vin from the power source to the power supply 40 for conversion into the regulated output voltage Vout. The power source 114 may also charge the battery 112.

When the power source 114 is inactive, the selector 116 selects the battery 112 to supply Vin to the power source 40.

From the foregoing it will be appreciated that, although specific embodiments of the invention have been described herein for purposes of illustration, various modifications may be made without deviating from the spirit and scope of the invention.

What is claimed is:

1. A power regulator, comprising:
a switching circuit operable to generate a regulated output voltage;
a controller operable to activate the switching circuit for a predetermined constant time when the regulated output voltage has a predetermined relationship to a threshold voltage; and
a threshold generator operable to generate the threshold voltage in response to the controller by ramping the threshold voltage at least while the switching circuit is inactive.

2. The regulator of claim 1 wherein the threshold generator is further operable to ramp the threshold voltage from a base voltage in response to the expiration of the predetermined time, and to return the threshold signal to the base voltage in response to the controller activating the switching circuit.

3. The regulator of claim 1 wherein the threshold generator is further operable to return the threshold voltage to a base voltage and to ramp the threshold voltage from the base voltage in response to the controller activating the switching circuit.

4. The regulator of claim 1, further comprising a comparator operable to compare the output voltage and the threshold voltage and to provide a result of the comparison to the controller.

5. The regulator of claim 1 wherein the threshold circuit is further operable to:
generate a base voltage equal to a sum of a reference voltage and an offset voltage;
ramp a ramp voltage from a starting value in response to the expiration of the predetermined time;
return the ramp voltage to the starting value in response to the controller activating the switching circuit; and
generate the threshold voltage equal to a sum of the base voltage and the ramp voltage.

6. The regulator of claim 1 wherein the threshold circuit is further operable to:
generate a base voltage equal to a sum of a reference voltage and an offset voltage;
return a ramp voltage to a starting value and then ramp the ramp voltage from the starting value in response to the controller activating the switching circuit; and
generate the threshold voltage equal to a sum of the base voltage and the ramp voltage.

7. A power-supply, comprising:
an output node operable to provide a regulated voltage;
a filter coupled to the node;
a switch operable to couple the filter to a source voltage;
a controller operable to cause the switch to couple the filter to the source voltage for a predetermined time in response to the regulated voltage having a predetermined relationship to a threshold voltage, the predetermined time being independent of the threshold voltage; and
a threshold generator operable to ramp the threshold voltage in response to the controller.

8. The power supply of claim 7, further comprising:
a reference node; and
wherein the filter comprises,
an inductor coupled between the switch and the output node, and
a capacitor coupled between the output node and the reference node.

9. The power supply of claim 7 wherein the source voltage is greater than the regulated output voltage.

10. The power supply of claim 7 wherein the switch comprises a transistor.

11. The power supply of claim 7 wherein the predetermined time is related to the source voltage.

12. The power supply of claim 7 wherein the controller is operable to:
compare the regulated voltage to the threshold voltage; and
cause the switch to couple the filter to the source voltage for a predetermined time in response to the regulated voltage being less than the threshold voltage.

13. A power-supply, comprising:
an output node operable to provide a regulated voltage;
a filter coupled to the node;
a switch operable to couple the filter to a source voltage;
a controller operable to cause the switch to couple the filter to the source voltage for a predetermined time in response to the regulated voltage having a predetermined relationship to a threshold voltage, the predetermined time being independent of the threshold voltage;
a threshold generator operable to generate the threshold voltage in response to the controller;
wherein the output voltage transitions between a predetermined reference voltage and a peak output voltage;
wherein the threshold circuit is further operable,
to generate a base voltage that is offset from the reference voltage,
to ramp the threshold voltage from the base voltage toward the reference voltage in response to the expiration of the predetermined time, and
to return the threshold voltage to the base voltage in response to the controller causing the switch to couple the filter to the source voltage; and
wherein the controller is further operable to cause the switch to couple the filter to the source voltage in response to the threshold voltage being greater than the regulated voltage.

14. A power-supply, comprising:
an output node operable to provide a regulated voltage;
a filter coupled to the node;
a switch operable to couple the filter to a source voltage;
a controller operable to cause the switch to couple the filter to the source voltage for a predetermined time in response to the regulated voltage having a predetermined relationship to a threshold voltage, the predetermined time being independent of the threshold voltage;
a threshold generator operable to generate the threshold voltage in response to the controller;
wherein the output voltage transitions between a predetermined reference voltage and a peak output voltage;
wherein the threshold circuit is further operable,
to generate a base voltage that is offset from the reference voltage, and
to return the threshold voltage to the base voltage and then ramp the threshold voltage from the base voltage toward the reference voltage in response to the controller causing the switch to couple the filter to the source voltage; and wherein the controller is further operable to cause the switch to couple the filter to the source voltage in response to the threshold voltage being greater than the regulated voltage.

15. The power supply of claim 13 wherein the threshold circuit is operable to ramp the threshold voltage such that the threshold voltage and the regulated voltage equal the reference voltage substantially simultaneously.

16. An electronic system, comprising:
a load;
a power source operable to generate a source voltage; and
a power supply operable to provide a current through the load and a regulated voltage across the load, the power supply comprising,
a filter coupled to the load,
a switch operable to couple the filter to the source voltage,
a controller operable to cause the switch to couple the filter to the source voltage for a predetermined time in response to the regulated voltage having a predetermined relationship to a threshold voltage, the predetermined time being independent of the current through the load, and
a threshold generator operable to generate the threshold voltage in response to the controller by ramping the threshold voltage at least while the filter is uncoupled from the source voltage.

17. The electronic system of claim 16 wherein the power source comprises a battery.

18. A method, comprising:
closing a switch for a time in response to a threshold voltage and a voltage across a load to provide current to the load, the time being independent of the voltage across the load;
changing the threshold voltage in response to the closing of the switch; and
ramping the threshold voltage at least while the switch is open.

19. The method of claim 18 wherein changing the threshold voltage comprises driving the threshold voltage toward a base voltage level.

20. The method of claim 18, further comprising:
wherein changing the threshold voltage comprises driving the threshold voltage toward a base voltage level;
opening the switch after the time; and
wherein ramping the threshold voltage comprises ramping the threshold voltage from the base voltage level in response to the opening of the switch.

21. The method of claim 18 wherein:
changing the threshold voltage comprises driving the threshold voltage toward a base voltage level; and
ramping the threshold voltage comprises ramping the threshold voltage from the base voltage level.

22. The method of claim 18, further comprising:
wherein ramping the threshold voltage comprises ramping the threshold voltage toward a voltage across the load before closing the switch, a difference between the threshold and load voltages having a polarity;
comparing the threshold voltage to the load voltage; and
wherein closing the switch comprises closing the switch in response to a change in the polarity of the difference between the threshold and load voltages.

23. A method, comprising:
closing a switch for a time in response to a threshold voltage to provide current to a load, the time being independent of a voltage across the load;
changing the threshold voltage in response to the closing of the switch;
ramping the threshold voltage, at least while the switch is open, from a predetermined base voltage toward a voltage across the load before closing the switch such that the threshold and load voltages equal a predetermined reference voltage at substantially the same time;
comparing the threshold voltage to the load voltage; and
wherein closing the switch comprises closing the switch in response to the threshold voltage equaling the load voltage.

24. A method, comprising:
closing a switch for a time in response to a threshold voltage and a voltage across a load to provide current to the load, the time being independent of the threshold voltage;
opening the switch after the time has expired; and
ramping the threshold voltage in response to the opening of the switch.

25. The method of claim 24 wherein ramping the threshold voltage comprises ramping the threshold voltage from a base voltage level.

26. The method of claim 24, further comprising:
wherein ramping the threshold voltage comprises ramping the threshold voltage from a base voltage level; and
driving the threshold voltage toward the base voltage level in response to the closing of the switch.

27. A method, comprising:
closing a switch for a time in response to a threshold voltage to provide current to a load, the time being independent of the threshold voltage;
opening the switch after the time has expired;
changing the threshold voltage by ramping the threshold voltage toward a voltage across the load in response to the opening of the switch, a difference between the threshold and load voltages having a polarity;
comparing the threshold voltage to the load voltage; and
wherein closing the switch comprises closing the switch in response to a change in the polarity of the difference between the threshold and load voltages.

28. A method, comprising:
closing a switch for a time in response to a threshold voltage to provide current to a load, the time being independent of the threshold voltage;
opening the switch after the time has expired;
changing the threshold voltage by ramping the threshold voltage from a predetermined base voltage toward a voltage across the load in response to the opening of the switch such that the threshold and load voltages equal a predetermined reference voltage at substantially the same time;
comparing the threshold voltage to the load voltage; and
wherein closing the switch comprises closing the switch in response to the threshold voltage equaling the load voltage.

* * * * *